United States Patent [19]

Ramqvist et al.

[11] 4,013,488
[45] Mar. 22, 1977

[54] PROCESS FOR IMPROVING THE ANTI-CORROSION PROPERTIES OF STEEL COATED WITH NICKEL OR COBALT

[75] Inventors: Lars H. Ramqvist; Nils Olle Grinder; Malte Sporrong, all of Nynashamn; Per Enghag, Garphyttan, all of Sweden

[73] Assignee: Rederiaktiebolaget Nordstjernan, Sweden

[22] Filed: Mar. 4, 1975

[21] Appl. No.: 555,286

[30] Foreign Application Priority Data

Mar. 14, 1974 Sweden .........................7403412

[52] U.S. Cl. .............................. 148/143; 29/196.6; 148/31.5; 148/134; 204/37 R
[51] Int. Cl.$^2$ ..........................................C23C 17/00
[58] Field of Search ................ 29/196.6; 148/31.5, 148/134, 143; 427/383, 405; 204/37 R, 38 R

[56] References Cited

UNITED STATES PATENTS

| 2,294,562 | 9/1942 | Kingston | 148/16.5 |
| 2,315,740 | 4/1943 | Schoonmaker | 204/37 R |
| 2,731,403 | 1/1956 | Rubin | 29/196.6 |
| 3,668,951 | 6/1972 | Talmage | 148/16.5 |
| 3,940,254 | 10/1974 | McMullen et al. | 29/196.6 |

FOREIGN PATENTS OR APPLICATIONS 1,191,732 5/1970 United Kingdom ............... 427/383

*Primary Examiner*—Arthur J. Steiner
*Attorney, Agent, or Firm*—Hopgood, Calimafde, Kalil, Blaustein and Lieberman

[57] ABSTRACT

A process is provided for coating a ferrous metal article, e.g. steel or iron, with a corrosion resistant surface layer comprising first coating said article with a layer of nickel and/or cobalt, heating said coated article for a time less than 45 minutes at a temperature in excess of 725° C and then applying to said first metal layer an additional layer of at least one of the metals selected from the group consisting of chromium, tin, lead, zinc, copper and cadmium.

5 Claims, No Drawings

PROCESS FOR IMPROVING THE ANTI-CORROSION PROPERTIES OF STEEL COATED WITH NICKEL OR COBALT

The present invention relates to a process of improving the anti-corrosion properties of ferrous metals, e.g. steel articles, with a surface layer containing nickel and/or cobalt.

STATE OF THE ART

It is known to coat steel already coated with a layer of nickel with another metal layer, such as zinc or chromium. In this way, an improvement in anti-corrosion properties of the steel is obtained. It is also known to coat steels with a layer of nickel and then to subject the coated steel to a diffusion heat treatment at a temperature in excess of about 725° C for a relatively short time in order to effect an improvement in the anti-corrosion properties thereof. In this connection, reference is made to U.S. Pat. No. 2,731,403.

It has now surprisingly been discovered that a combination of these known processes provides a considerably improved effect with respect to the anti-corrosion properties of the steel.

OBJECTS OF THE INVENTION

One object of the invention is to provide a process for improving the corrosion resistant properties of a ferrous metal article, e.g. a steel substrate or article, already coated with a surface layer of nickel and/or cobalt.

Another object of the invention is to provide a coated steel article characterized by improved resistance to corrosion.

These and other objects will more clearly appear when viewed in the light of the following disclosure and the appended claims.

STATEMENT OF THE INVENTION

Accordingly, the present invention relates to a process of improving the anti-corrosion properties of a steel starting with a relatively thin surface layer of metal selected from the group nickel and cobalt. The process according to the invention comprises first subjecting the coated steel article having a surface layer of nickel and/or cobalt to a bonding heat treatment for a time less than about 45 minutes at a temperature in excess of about 725° C and then applying another relatively thin layer of an additional metal comprising essentially at least one of the metals selected from the group consisting of chromium, tin, lead, zinc, copper and cadmium to said first surface layer of nickel and/or cobalt.

The heat treatment of the nickel and/or cobalt layer comprises the first stage of the present invention. This heat treatment should take place within such limits with respect to temperature and time that the diffusion of nickel and/or cobalt into the steel substrate is sufficiently inhibited and preferably does not exceed a maximum of a few microns. In this manner, diffusion of iron into the nickel and/or cobalt layer will also be sufficiently inhibited. This is achieved by carrying out the heat treatment at a temperature in excess of about 725° C for a time less than about 45 minutes. Actually, the best results are obtained as regards the anti-corrosion properties of the final surface layer if the heat treatment of the steel object precoated with nickel and/or cobalt is carried out for a time substantially less than 30 minutes. Thus, it has been found that diffusion of nickel and/or cobalt into the substrate is further inhibited if the heat treatment is less than 15 minutes. Tests have indicated that better anti-corrosion properties are obtained at less than 15 minutes of heat treatment as compared to heat treatment times of between 15 and 30 minutes and that periods of heat treatment of even less than about 5 minutes provide the best properties in the final surface layer. The time at which the temperature of treatment of the surface layer amounts to or exceeds 725° C is referred to as the period of heat treatment.

Periods of heat treatment in excess of 45 minutes have been found to cause diffusion of such an order that the properties of the surface layer are markedly deteriorated in one or more respects. It has been found that heat treatment at a temperature below 725° C, i.e. below the temperature at which a phase transition to austenitic structure of carbon steels begins, does not provide good adhesion of the nickel and/or cobalt surface layer.

It has been observed that a heat treatment at a temperature in excess of 725° C for a time shorter than 1 minute provides an excellent product which is quite superior to non-heat treated products and to products which have been treated for a time in excess of 45 minutes.

The article (of steel or iron) to which the surface layer of nickel and/or cobalt is applied can be of arbitrary form and composition. Conventional carbon steel in the form of plates, pipes or bands is suitable for many purposes. According to the present invention, it has also been found advantageous to apply the surface layers to such finished steel objects as bolts, screws and castings.

The very short time of treatment is believed to be due to the fact that the interlayer between the surface layer and the substrate recrystallizes very rapidly because of high inherent surface energy and that an atomic bond is achieved to the substrate by this recrystallization. If the time of heat treatment is too long, e.g. substantially more than 45 minutes at temperature, diffusion occurs which gradually impairs the corrosion resistant properties of the surface layer.

In the electrolytic coating of steel with a first layer of nickel or cobalt, a certain amount of pores is apt to form passing through the whole layer and thus expose the steel surface. If a new metal layer, such as zinc, is applied on top of this first layer, atomic hydrogen is precipitated in the pores which diffuses into the steel and causes so-called hydrogen embrittlement. By the heat treatment according to the present invention, two positive effects are achieved with respect to avoiding hydrogen embrittlement. For example, the hydrogen, which penetrates the steel during pickling and during the electrolytic coating of nickel or cobalt, is released by diffusion, and the pores formed in the nickel or cobalt layer tend to close themselves so that the steel surface is no longer exposed. This prevents additional hydrogen absorption by the steel during the application of the next metal layer.

The heat treatment according to the invention is usually carried out in a neutral or reducing atmosphere. Such conditions may preferably comprise a protective gas, such as argon, or a reducing gas, such as hydrogen or carbon monoxide. The heat treatment can, if desired, also be carried out in air, especially if a colored surface is desired.

In order to assure optimum improvement of the anti-corrosion properties in practice, the temperature during heat treatment should be at least about 725° C at the surface layer, as stated above. A usable range of temperature has been found to be about 725° to 1000° C. It is preferred that the best treatment be carried out at a temperature at which there is a complete transformation into austenitic structure. It appears that temperatures below 725° C result in such a slow crystallization in the interlayer that no adhesion occurs, unless longer periods of heat treatment are used. If, on the other hand, long periods of heat treatment are used, the properties of the substrate material tend to deteriorate. Thus, a very essential advantage of the new process is that the substrate material is not changed appreciably by the short time of treatment used. This is of great importance in the manufacture of wire, among other products, as the microstructure is very important for assuring the desired mechanical properties of the wire, such as elasticity and fatigue strength.

One of the advantages of the invention is that hardenable steels which have been surface coated with nickel and/or cobalt can be hardened in connection with the present heat treatment by cooling the article rapidly following completion of the heat treatment so that an austenitic decomposition product is obtained comprising a martensitic structure, provided that, during heat treatment, the steel article is heated to an austenitizing temperature in excess of 725° C. Such steels may contain up to about 0.9% carbon by weight, for example, at least about 0.05% carbon, and preferably about 0.2 to 0.6% carbon. The term "steel" used herein is meant to cover iron as well.

The surface layer containing nickel and/or cobalt is applied to the article (of steel or iron) in conventional manner by electrolysis or chemically. Plating baths are disclosed in the book entitled *Modern Electroplating* (Second Edition, 1953) published by John Wiley and Sons, for example on pages 141 to 146, 260 to 263 and 282 to 286.

To the surface layer of nickel and/or cobalt following heat treatment, a thin additional layer of one or more of the metals chromium, tin, lead, zinc, copper and cadmium is then applied. This layer can also be applied in a conventional manner, e.g. by electrolysis, by spraying of molten metal on the steel substrate or by chemical deposition. Such methods are well known to those skilled in the art.

Markedly improved results have been obtained with the coating of article characterized by uniform smooth surfaces, for example, steel pipes, steel plates, strip and the like. Thus, an iron pipe (about 0.01% C by weight) coated inside and outside with nickel in accordance with the invention (e.g. a nickel electroplate of about 10 microns thick and heat treated at 870° C and 20 minutes) and then coated with a zinc electroplate of about 10 microns exhibited a resistance to corrosion under the salt spray test (ASTM B-117) for a very long period of time as evidenced by the appearance of red rust after about 800 to 1000 hours.

In tests conducted on threaded steel articles or other complicated shape, it has been found that a normal carbon steel (about 0.4% carbon) coated with a layer of nickel or cobalt of thickness of about 10 microns and which has not been subsequently heat treated, exhibited red rust attack after about 10 hours in a salt spray test (ASTM B-117). These same articles coated with a zinc layer alone of about 10 microns thick exhibited red rust in the same test after about 90 to 100 hours. On the other hand, when such threaded carbon steel articles were first coated with a nickel layer of 10 microns thick and then heat treated according to the invention followed by coating with a zinc layer of about 10 microns thick, red rust did not appear until after about 200 to 300 hours under the same testing conditions. This is unusual for such complicated shapes. Similar improved results are obtainable with cobalt as the first layer closest to the steel and with metals other than zinc as the second or outer layer. Thus, markedly improved properties with respect to resistance to corrosion have been obtained for the following coating combinations: nickel-cadmium, nickel-copper and others. It will be observed from these tests that it is very important that the original nickel or cobalt layer be subjected to heat treatment according to the invention before the second metal layer is applied. It has also been noted that a nickel layer having a thickness of about 10 microns and which has not been heat treated, does not provide the marked improvements of the invention as regards anti-corrosion properties, even when a zinc layer is applied to the nickel layer.

Similarly, in cases where the nickel layer has been subjected to too long a heat treatment of more than 45 minutes at a temperature in excess of 725° C, inferior properties have been obtained. It is believed that apparently iron diffuses into the nickel which results in red rust appearing much sooner. In the conventional hot-dip coating of zinc, some amount of dissolved iron will appear in the zinc layer which has a deteriorating effect on the anti-corrosion properties.

The preferred aspects of the invention will be apparent from the following examples.

EXAMPLE 1

For comparison with known techniques, the following surface coatings were made on a 1.5 mm (about 0.06 inch) steel wire of carbon steel (about 0.7% carbon).

A. Coating with 1 micron tin layer alone by hot-dip coating.
B. Coating with 15 micron zinc layer alone by hot-dip coating.
C. Coating with 10 micron nickel layer by electrolysis and heat treated.
D. Coating with 10 micron nickel layer by electrolysis, heat treated at 850° C for 4 minutes and then coated with 12 micron zinc layer on top of the nickel layer by electrolysis according to the present invention.

Corrosion attack as evidenced by the appearance of red rust was evaluated after testing each specimen in the salt spray atmosphere according to ASTM B-117 and the following results were obtained:

A. Red rust occurred after a testing period of 5 hours.
B. Red rust occurred after a testing period of 35 hours.
C. Red rust occurred after a testing period of 20 hours.
D. No attack due to red rust occurred after a testing period of 300 hours.

As will be noted, markedly improved results are obtained with the invention (i.e. D).

EXAMPLE 2

Bolts of carbon steel (about 0.4% carbon) were coated with a 10 micron layer of nickel by electrolysis by barrel plating in a nickel salt solution (from a Watts Bath at 1 amp/dm² and 50° C and 50 minutes) and were then hardened by heating to 850° C for 10 minutes and by cooling in oil. The bolts were coated with a 10 micron zinc layer electrolytically according to a known process comprising 15 to 20 gpl (grams per liter) zinc, 25 to 45 gpl of sodium cyanide, 80 gpl NaOH, the plating being carried out at a current density of about 1 amp/dm² for 60 minutes at room temperature. For comparison purposes, the same bolts were hardened without nickel layers and then coated with a 10 micron zinc layer.

Improved results were obtained with the bolts coated according to the present invention in that red rust formed after a salt spray testing period of 200 hours; whereas, red rust was observed after a shorter period of 95 hours for the bolts electrolytically coated with zinc alone in the conventional manner. Bolts coated only with a 10 micron nickel layer (followed by heat treating at 870° C for 20 minutes) corroded after a very short period of 10 hours.

EXAMPLE 3

Tests were conducted with 100 steel or iron pipe samples (about 0.01% C) measuring 200 mm long and 10 mm in diameter. The pipes were coated with a 10-micron layer of nickel from a Watts Bath at a current density of about 4 amps/dm² at room temperature. The coated pipes were then subjected to a bonding heat treatment at 870° C for 20 minutes in argon, 50 of the pipe samples being then coated with zinc according to the process described in Example 2, while the remaining 50 were not. In addition, 50 pipe samples without the nickel coating were coated with a 10-micron layer of zinc as in Example 2.

All of the pipes were subjected to a salt spray test referred to as ASTM B-117 and the following results obtained:

| Pipe Samples | Average Time For Red Rust to Appear |
| --- | --- |
| (1) 50 pipes Ni-coated and heat treated | 10 hours |
| (2) 50 pipes zinc-coated only | 110 hours |
| (3) 50 pipes Ni-coated (heat treated) and then zinc coated | 900 hours |

Broadly speaking, the first coating metal nickel and/or cobalt may be applied at a thickness of at least several microns and may range from over 2 or 3 to 25 or even to 50 microns, depending upon the economics of the process and the configuration of the articles. The second coating metal selected from the group consisting of Cr, Sn, Pb, Zn, Cu and Cd may be applied similarly at a thickness of over several microns and range from over 2 or 3 to 25 or even to 50 or more microns depending upon the economics of the process and the configuration of the article. A preferred range of thicknesses of the foregoing coatings is 5 to 25 microns.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A process for improving the corrosion resistance of a steel article subject to corrosion which comprises,
    plating said article with a first thin layer of at least one metal selected from the group consisting of nickel and cobalt over a thickness range of over about 2 to 50 microns,
    heat treating said coated article in a protective or reducing atmosphere at an austenitizing temperature falling within the range of about 725° to 1000° C at substantially less than about 45 minutes,
    and then applying a second thin layer of at least one metal selected from the group consisting of chromium, tin, lead, zinc, copper and cadmium to said first layer of a thickness of over about 2 to 50 microns,
    whereby a coated article is obtained characterized by improved resistance to corrosion.

2. The process of claim 1, wherein the period of heat treatment at said austenitizing temperature is less than 15 minutes.

3. The process of claim 2, wherein the period of heat treatment at said austenitizing temperature is less than 5 minutes.

4. The process of claim 1, wherein the steel article contains up to about 0.9% carbon by weight and wherein following the bonding heat treatment at said austenitizing temperature, the article is rapidly cooled to form a martensitic structure.

5. The process of claim 4, wherein the steel article contains about 0.2 to 0.6% carbon and wherein following the bonding heat treatment at said austenitizing temperture, the article is rapidly cooled to form a martensitic structure.

* * * * *